US011796369B2

(12) United States Patent
Vianello et al.

(10) Patent No.: US 11,796,369 B2
(45) Date of Patent: *Oct. 24, 2023

(54) GAS METER HAVING A STATIC METERING DEVICE THEREIN FOR MEASURING THE GAS FLOW AND PREVENT TAMPERING

(71) Applicant: Pietro Fiorentini S.P.A., Arcugnano (IT)

(72) Inventors: Mario Vianello, Garbagna Novarese (IT); Marcello Ghidina, Vigevano (IT); Claudio Imboccioli, Creazzo (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 258 days.

This patent is subject to a terminal disclaimer.

(21) Appl. No.: 17/056,326

(22) PCT Filed: Jun. 17, 2019

(86) PCT No.: PCT/IB2019/055052
§ 371 (c)(1),
(2) Date: Nov. 17, 2020

(87) PCT Pub. No.: WO2019/244005
PCT Pub. Date: Dec. 26, 2019

(65) Prior Publication Data
US 2021/0278267 A1    Sep. 9, 2021

(30) Foreign Application Priority Data
Jun. 18, 2018 (IT) .................. 102018000006409

(51) Int. Cl.
*G01F 15/14* (2006.01)
*G01F 15/00* (2006.01)
*G01F 15/18* (2006.01)

(52) U.S. Cl.
CPC ............ *G01F 15/14* (2013.01); *G01F 15/005* (2013.01); *G01F 15/185* (2013.01)

(58) Field of Classification Search
None
See application file for complete search history.

(56) References Cited

U.S. PATENT DOCUMENTS

| 3,686,947 A | 8/1972 | Maeshiba |
| 4,406,163 A | 9/1983 | Lofink |
| (Continued) | | |

FOREIGN PATENT DOCUMENTS

| EP | 0 987 526 A2 | 3/2000 |
| EP | 1 128 167 A1 | 8/2001 |
| (Continued) | | |

OTHER PUBLICATIONS

International Search Report and Written Opinion dated Sep. 26, 2019, issued in PCT Application No. PCT/IB2019/055052, filed Jun. 17, 2019.

*Primary Examiner* — Harshad R Patel
(74) *Attorney, Agent, or Firm* — Workman Nydegger (57) ABSTRACT

A gas meter includes: a box-shaped body, an inlet mouth and an outlet mouth suited to allow the passage of a gas flow and defined on the box-shaped body, wherein inside the box-shaped body there is a metering device designed to measure one or more parameters for the determination of the gas flow rate, the metering device being provided with an inlet opening and an outlet opening. The gas meter includes: an inlet duct extending from the inlet mouth towards an opposite side of the box-shaped body, an outlet duct extending between the outlet mouth and an opposite side of the box-shaped body, the metering device being positioned in an intermediate area between the inlet duct and the outlet duct.

16 Claims, 6 Drawing Sheets

(56) References Cited

U.S. PATENT DOCUMENTS

| | | | |
|---|---|---|---|
| 9,612,146 B2* | 4/2017 | Speldrich | G01F 15/125 |
| 11,585,689 B2* | 2/2023 | Vianello | G01F 15/18 |
| 2012/0118407 A1* | 5/2012 | Sonnenberg | G01F 1/6842 |
| | | | 137/551 |
| 2013/0199290 A1 | 8/2013 | Braun et al. | |
| 2017/0241822 A1 | 8/2017 | Wong et al. | |
| 2019/0212180 A1* | 7/2019 | Stetsenko | G01F 15/00 |

FOREIGN PATENT DOCUMENTS

| | | |
|---|---|---|
| EP | 1 128 167 A9 | 11/2001 |
| EP | 2 813 824 A1 | 12/2014 |
| WO | 99/51943 A1 | 10/1999 |
| WO | 2012/169201 A1 | 12/2012 |

\* cited by examiner

GAS METER HAVING A STATIC METERING DEVICE THEREIN FOR MEASURING THE GAS FLOW AND PREVENT TAMPERING

BACKGROUND OF THE INVENTION

1. The Field of the Invention

The invention concerns a gas meter.

2. The Relevant Technology

Gas meters of the static type, meaning gas meters that do not have moving members, are currently known and widespread; these gas meters incorporate a sensor that measures a value and transmits the measured data to an electronic control unit located outside the metering unit.

The need to make gas meters safe against tampering attempts is increasingly felt in the sector.

According to the current national regulations, installers are not obliged to seal with lead, that is, to seal the outlet connection element of gas meters against tampering, and consequently said outlet connection elements become potential access points from which it is possible to reach the body of the meter and tamper with it.

Meters are known which, in order to overcome this drawback, are configured in such a way as to stop a gas flow in case of anomalies or in case of tampering attempts or in case of failure to pay the gas bill by the user.

More specifically, gas meters are currently known which comprise a box-shaped body provided with an inlet mouth and an outlet mouth, both facing upwards with respect to a normal configuration of use of the gas meter; inside the box-shaped body there are, in the given order, a mechanical filter, at the level of the inlet mouth, a solenoid valve designed to intercept the flow and a metering device suited to measure one or more parameters for the determination of the gas flow rate such as, for example, a device of the static type provided with temperature sensors.

In said gas meters of the known type, the position of the metering device is such that the same metering device is directly connected to the outlet connection element and arranged so that it is adjacent to the latter, a position in which the metering device is likely to be tampered with since, as explained above, the current regulations do not require the outlet connection element to be sealed.

A similar situation is described, for example, in the patent documents WO2012/169201A1, WO99/51943A1, U.S. Pat. No. 4,406,163A and US2013/199290A1.

The presence of a mesh protection filter between the metering device and the outlet connection element does not seem to be an effective solution in case of tampering attempts, either, such attempts including, for example, the attempt to disconnect the metering device, to foul the one or more sensors present in the metering device, to damage it with compressed air, and similar attempts.

Another serious limitation of the known gas meters lies in that the on-off solenoid valve is positioned at the level of the meter's inlet mouth; in this position the solenoid valve is thus subjected to contamination by the dust contained in the gas coming from the gas mains.

A mechanical filter may be positioned before the valve, for example a filter of the type with metal mesh, configured to hold back the larger sized particles but, in any case, finer dust falls inside the solenoid valve by gravity, thus negatively affecting its operation over time.

Furthermore, as the filter saturates, the resistance of the same to the gas flow increases, which consequently leads to an increase in the pressure difference between the distribution network, which is located upstream of the meter, and the outlet of the latter.

Furthermore, the particles are not collected in a circumscribed space and are continuously hit by the main gas flow before this gets into the solenoid valve which, therefore, ends up with collecting most of such particles.

SUMMARY OF THE INVENTION

It is the object of the present invention to provide a gas meter that is capable of overcoming the above-mentioned drawbacks and limitations of the known art.

More specifically, it is an object of the invention to provide a gas meter that is safer against tampering risks.

Again, it is an object of the invention to provide a gas meter whose performance levels are not lower than those ensured by the known gas meters.

It is another object of the invention to provide a gas meter in which the metering device and the solenoid valve are more protected from the dust contained in the gas coming from the gas supply network.

It is another object of the invention to provide a gas meter that is capable of operating within the limits set by the regulations in force.

The purpose as well as the objects described above are achieved by a gas meter according to the claims.

Further characteristics of the gas meter according to claim 1 are described in the dependent claims.

BRIEF DESCRIPTION OF THE DRAWINGS

The purpose and the objects illustrated above, as well as the advantages that will be described further on, are highlighted in the description of an embodiment of the invention that is provided by way of non-limiting example with reference to the attached drawings, wherein.

DETAILED DESCRIPTION OF THE PREFERRED EMBODIMENTS

With reference to the figures mentioned above, a gas meter according to the invention is indicated as a whole by the numeral 10.

Said gas meter 10 comprises
a box-shaped body 11,
an inlet mouth 15 and an outlet mouth 16 designed to allow the passage of a gas flow and defined on the box-shaped body 11.
Inside the box-shaped body 11 there is a metering device 19 designed to measure one or more parameters for the determination of the gas flow rate; this metering device 19, too, is provided with an inlet opening 19a and an outlet opening 19b of its own.

The specific characteristic of the gas meter 10 according to the invention lies in that it comprises:
- an inlet duct 25 extending from said inlet mouth 15 towards an opposite side 13 of the box-shaped body 11,
- an outlet duct 40 extending between the outlet mouth 16 and an opposite side 13 of the box-shaped body 11.

The metering device 19 is positioned in an intermediate area between the inlet duct 25 and the outlet duct 40.

The term 'intermediate area' is used to indicate the space included between the inlet duct 25 and the outlet duct 40 inside the box-shaped body 11.

The metering device 19 must therefore be intended as suited to be positioned in any point and with any configuration in said space included between the inlet duct 25 and the outlet duct 40.

Inside the box-shaped body 11 there are means 20 configured in such a way as to deviate the gas flowing out through the outlet opening 19b of the metering device 19 towards an inlet opening 40a of the outlet duct 40.

Figure 1:
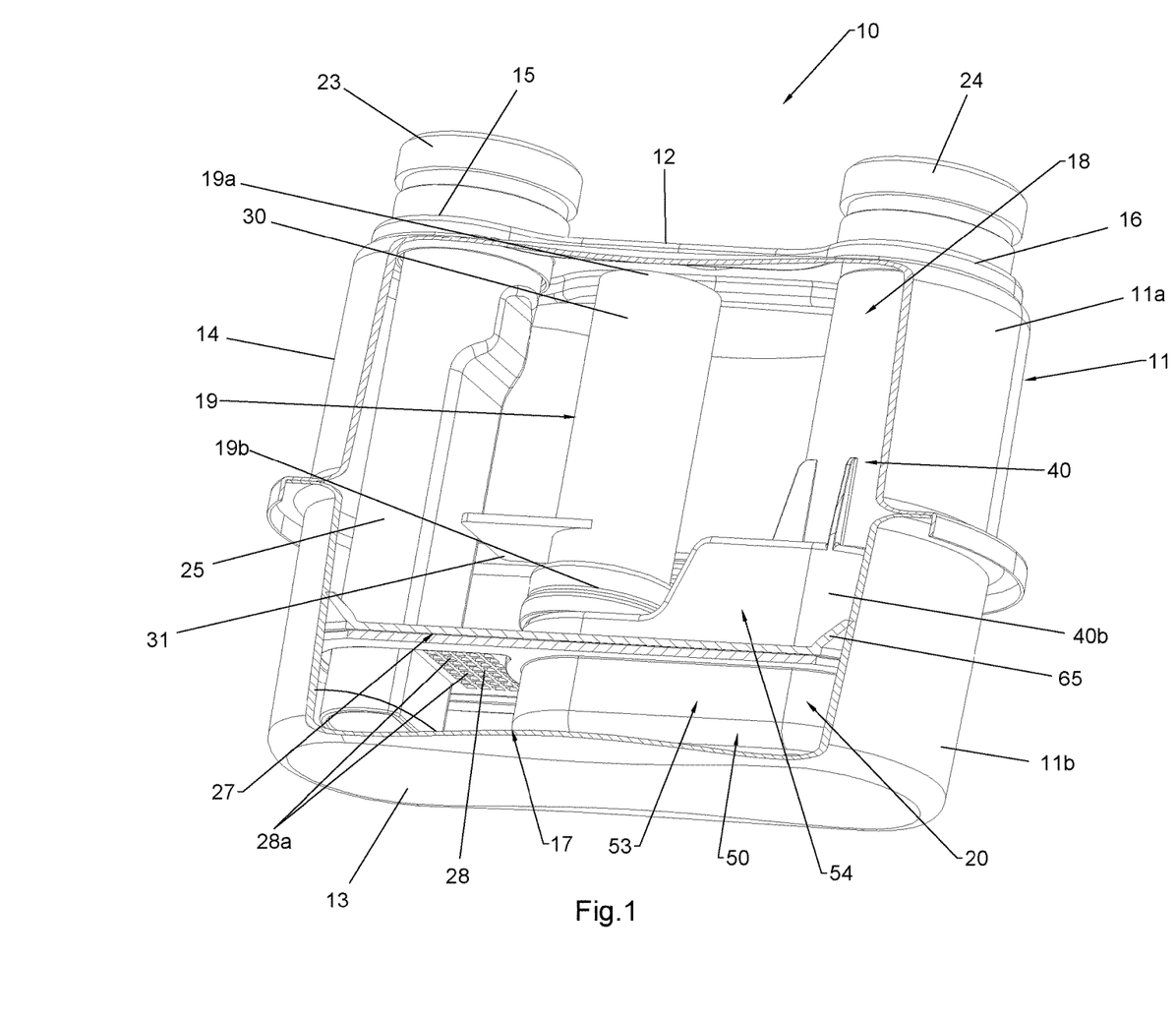
FIG. 1 shows a perspective sectional view of a gas meter according to the invention.
Figure 2:
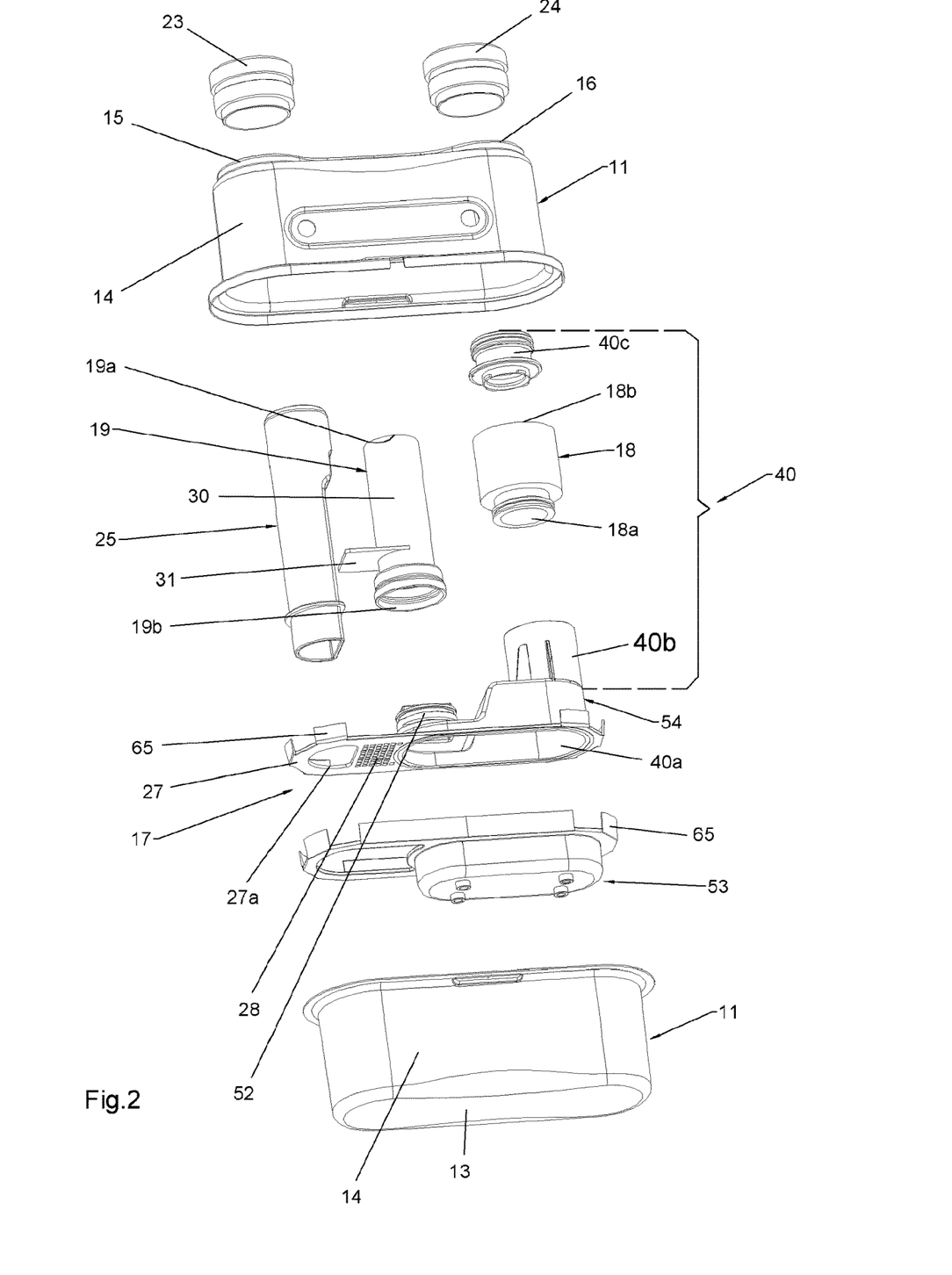
FIG. 2 shows a perspective exploded view of a gas meter according to the invention.
Figure 3:
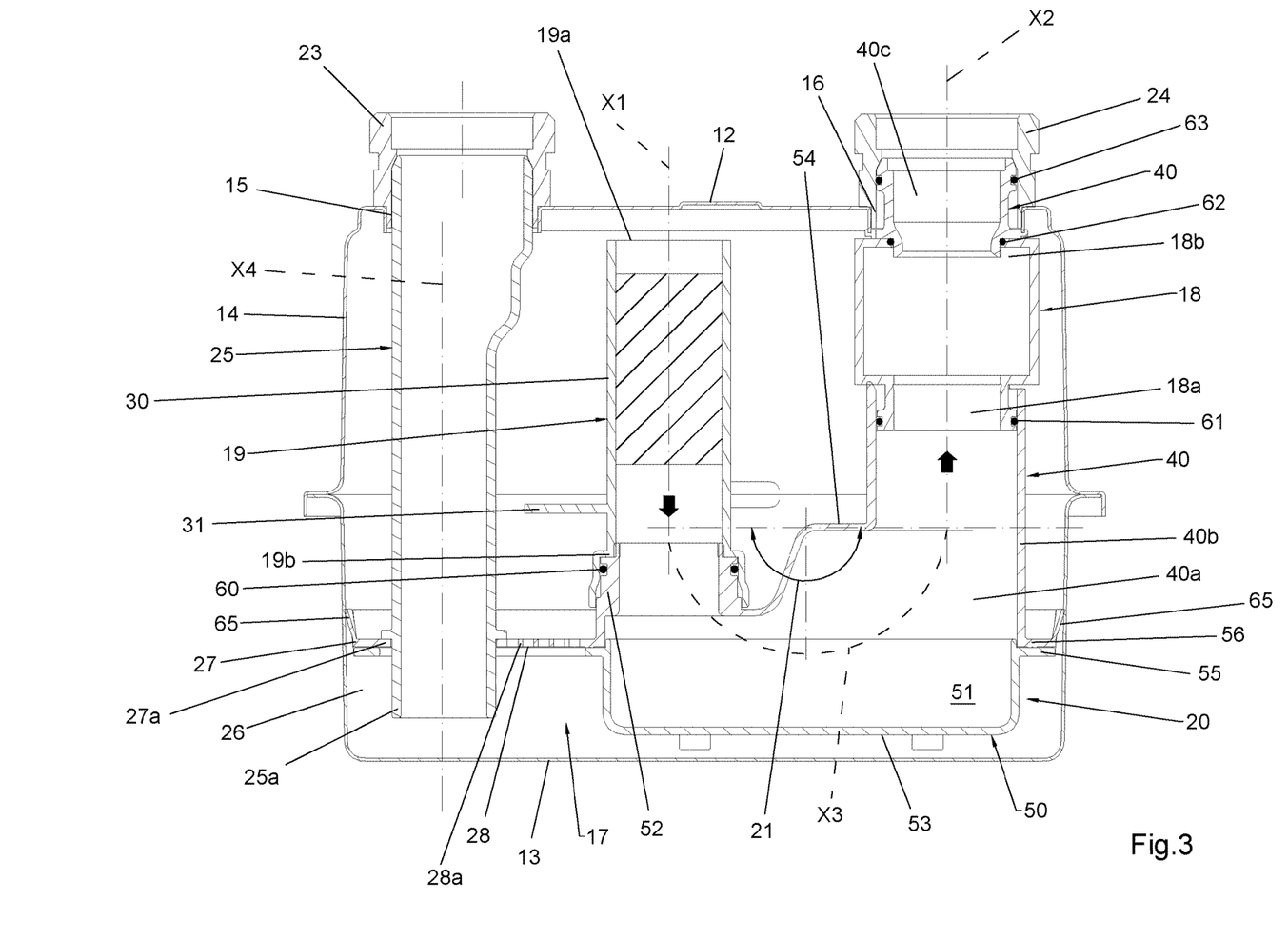
FIG. 3 shows a side sectional view of a gas meter according to the invention.

As clearly visible in FIG. 3, said means 20, configured in such a way as to deviate the gas flowing out through the outlet opening 19b of the metering device 19 towards the inlet opening 40a of the outlet duct 40, define a trajectory X3 comprising a deviation that develops over a deviation angle 21 between a direction X1 crossing the metering device 19 and a direction X2 crossing the outlet duct 40, said deviation angle 21 being included in an interval ranging between a neighbourhood of 90° and 225°.

The expression 'neighbourhood of 90°' is used to indicate an interval between −15° and +15° with respect to 90°.

Said deviation angle 21 is preferably included between 91° and 225°.

Figure 4:
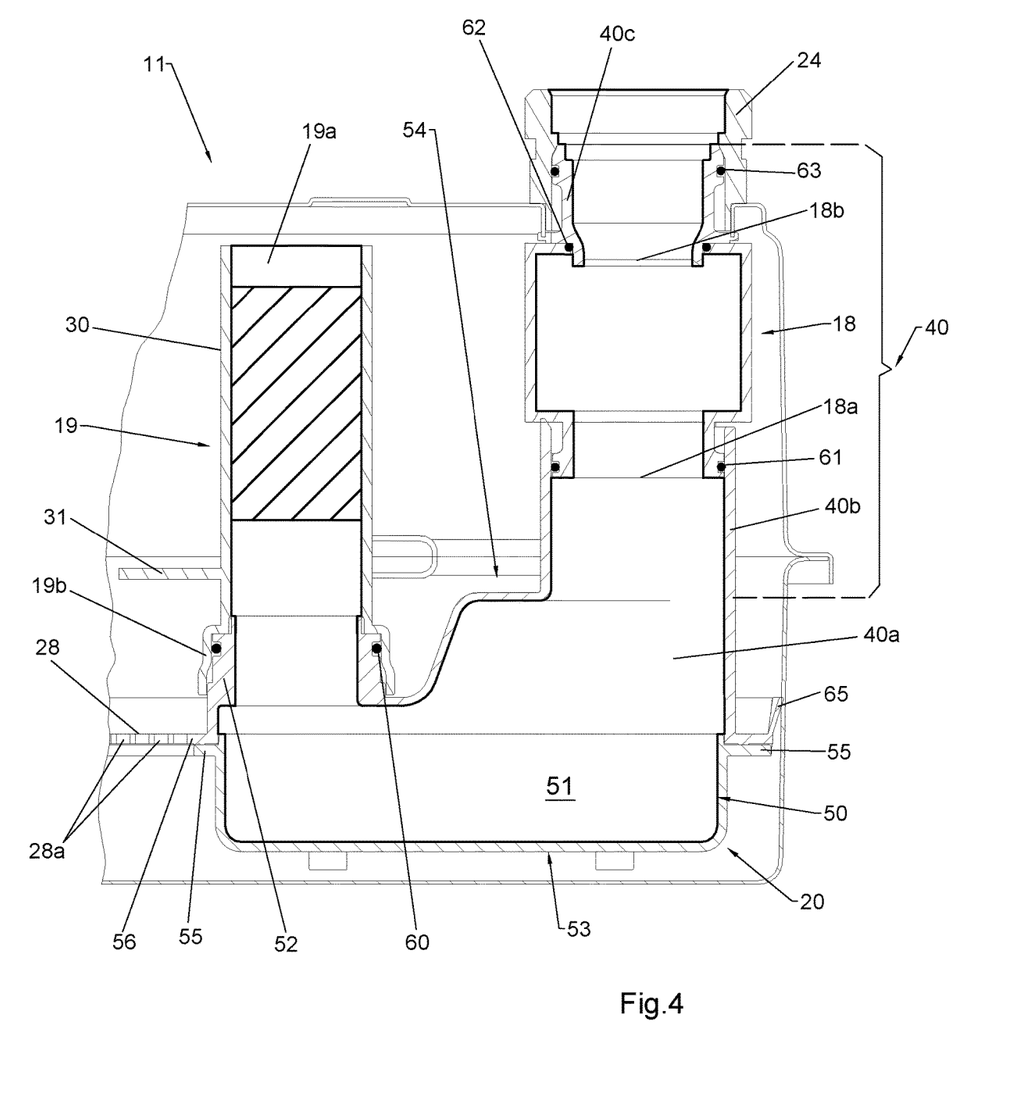
FIG. 4 shows a detail of the side sectional view of FIG. 3.

More specifically, said deviation angle 21 is equal to 180°, as clearly visible in FIGS. 3 and 4.

In the present example of embodiment, the box-shaped body 11 comprises, with respect to a normal configuration of use, a top side 12, an opposite bottom side 13 and a side wall 14.

The outlet mouth 16 is defined on the top side 12.

More specifically, the inlet mouth 15 and the outlet mouth 16 are defined on the top side 12.

It must be understood that the inlet mouth 15 and the outlet mouth 16 can both be provided on another, yet the same, side different from the top side 12.

It must be understood that the inlet mouth 15 and the outlet mouth 16 can each be provided on a respective side of the box-shaped body 11, different from the side on which the other mouth is provided.

In the preferred variant embodiment, the gas meter 10 comprises also an on-off valve 18 suited to intercept the gas flow across the gas meter 10, said on-off valve 18 being provided with an inlet opening 18a and an outlet opening 18b.

In the present example of embodiment, the on-off valve 18 is located at the level of the outlet mouth 16 of the box-shaped body 11.

The on-off valve 18 is a part of the outlet duct 40.

In the present example of embodiment, the gas meter 10 comprises a first threaded connection element 23 at the level of the inlet mouth 15 of the box-shaped body 11 and a second threaded connection element 24 at the level of the outlet mouth 16 of the box-shaped body 11.

The gas meter 10 comprises also filtering means 17 suited to filter the gas flow.

Said filtering means 17 comprise a dust deposit chamber 26 defined between the bottom side 13 of the box-shaped body 11 and a mechanical filtering partition 27 interposed between the bottom side 13 and the top side 12.

Said mechanical filtering partition 27 comprises a mesh portion 28.

Said mesh portion 28 has through openings 28a; the dimensions of said through openings 28a are such as to prevent the passage of dust particles with particularly large diameter, meaning that said through openings 28a have a cross section whose main dimension, for example their side if they are square in shape or their diameter if they are round in shape, is included between 0.5 and 3 mm, and preferably is equal to 1 mm.

In a variant embodiment of the invention, the mesh portion 28 may comprise several filtering layers, sandwich-layered or spaced from one another, each layer being constituted by a mesh or a net or a non-woven fabric.

The inlet duct 25 extends from the inlet mouth 15 of the box-shaped body 11 to the inside of the dust deposit chamber 26.

Said inlet duct 25 is configured in such a way that the gas flow entering through the first threaded connection element 23 is not dispersed in the inner compartment of the box-shaped body 11 but is directly and completely conveyed into the dust deposit chamber 26.

Then, the mechanical filtering partition 27 is provided with a through hole 27a configured so that the inlet duct 25 can pass through it.

Said dust deposit chamber 26 is configured in such a way that the gas flow coming from the inlet duct 25 can exit from it only through the mesh portion 28 of the mechanical filtering partition 27.

In the present example of embodiment, which must obviously be understood as a non-limiting example of the invention, the metering device 19 is positioned, as mentioned above, in an intermediate area between the outlet duct 40 and the inlet duct 25, beside both the outlet duct 40 and the inlet duct 25.

In said intermediate position, and thanks to the means 20 for deviating the gas flow that exits from the outlet opening 19b of the metering device 19 and is directed towards the inlet opening 40a of the outlet duct 40, the metering device 19 is substantially inaccessible in case of any tampering attempt made both through the outlet mouth 16 and through the inlet mouth 15 of the box-shaped body 11, if this should be the case.

In fact, due to the presence of the inlet duct 25 and the mechanical filtering partition 27, on the one hand, and of the outlet duct 40 and the flow deviation means 20, on the other hand, the metering device 19 is substantially positioned at the centre of a maze-like route that cannot be accessed using the currently known break-in tools.

In the present example of embodiment, the inlet duct 25 is constituted by a tubular element that extends along a crossing direction X4.

The crossing direction X4 is preferably parallel to the crossing direction X1 of the metering device 19 and the crossing direction X2 of the outlet duct 40.

In the present example of embodiment, the outlet duct 40 comprises:
- an entry section 40b, in turn comprising the inlet opening 40a,
- an exit section 40c,
- the on-off valve 18, interposed between the entry section 40b and the exit section 40c.

The on-off valve 18 is connected to the entry section 40*b* and to the exit section 40*c* in such a way that it is coaxial with both of them.

The exit section 40*c* is constituted by a sleeve positioned in such a way that it passes through the outlet mouth 16 and connects with the second threaded connection element 24.

The metering device 19, for example, is a flow rate meter of the static type.

Said metering device 19 may comprise
a transit pipe 30 designed to allow the transit of the gas flow and including the inlet opening 19*a* and the outlet opening 19*b*, and inside which real sensors are provided,
and an intercepting projection 31 positioned outside the transit pipe 30 and designed to meet the gas flow coming from the mesh portion 28.

Said intercepting projection 31 is constituted, for example, by a flat element extending from the transit pipe 30 according to a reference plane lying crosswise with respect to the flowing direction of the gas flow.

In a variant embodiment of the invention, the metering device 19 comprises an electronic interface unit that is external to the transit pipe 30 and is configured in such a way that it can receive the metering signals emitted by the sensors, transmit them to a remote control unit and power the sensors.

More specifically, in the present example of embodiment of the gas meter 10 according to the invention, the metering device 19 is positioned with its crossing direction X1 parallel to the crossing direction X2 of the outlet duct 40.

More specifically, the metering device 19 is positioned with the inlet opening 19*a* in proximity to the top side 12 of the box-shaped body 11.

Even more specifically, the inlet opening 19*a* faces upwards with respect to a normal configuration of use of the gas meter 10.

Thus, the metering device 19 is positioned with the inlet opening 19*a* facing towards the top side 12 of the box-shaped body 11 with respect to a normal configuration of use.

Even more specifically, the metering device 19 is positioned in such a way that the intercepting projection 31, or the electronic interface unit, is arranged above the mesh portion 28; in this way, the intercepting projection 31 contributes to deviating the gas flow, leading to the consequent accumulation of any dust residues present in the gas flow on the surface of the intercepting projection 31 itself or on the surface of the casing containing the electronic interface unit.

In this specific configuration of the gas meter 10, the mechanical filtering partition 27 is interposed between the bottom side 13 and the inlet opening 19*a* of the metering device 19.

More specifically, the mechanical filtering partition 27 is interposed between the bottom side 13 and the casing containing the electronic interface unit 31 of the metering device 19.

In the present example of embodiment, the mechanical filtering partition 27 is provided with perimeter sealing edges 65 that are configured in such a way as to be placed in contact with the inner surface of the box-shaped body 11 and press against it, thus ensuring tightness against the passage of gas containing fine dust.

In the embodiment of the invention described herein by way of non-limiting example of the invention itself, the means 20, which are configured to deviate the gas flow that exits from the outlet opening 19*b* of the metering device 19 towards the inlet opening 40*a* of the outlet duct 40, comprise a hollow body 50 inside which a deviation chamber 51 is defined.

In the present example of embodiment, the hollow body 50 comprises:
a joining collar 52 suitable for connection with the outlet opening 19*b* of the metering device 19,
and the entry section 40*b* of the outlet duct 40.

Both the joining collar 52 and the entry section 40*b* are obviously open and in communication with the deviation chamber 51.

In the present example of embodiment, the hollow body 50 is constituted by a container 53 closed by a shaped cover 54.

The joining collar 52 and the entry section 40*b* are defined on the shaped cover 54.

The container 53 has a first rest edge 55 where a corresponding second rest edge 56 of the shaped cover 54 can be rested.

Said first rest edge 55 and second rest edge 56 are sealed together, for example by means of a heat welding operation.

Said hollow body 50 is positioned in proximity to the bottom side 13 of the box-shaped body 11.

The metering device 19, the gas flow deviation means 20 and the outlet duct 40 are connected to one another in such a way as to define a tight path configured to prevent the leakage of the gas flow already measured through the metering device 19.

More specifically:
the outlet opening 19*b* of the metering device 19 and the joining collar 52 of the hollow body 50 are connected, with at least one sealing ring 60 interposed therebetween;
the entry section 40*b* of the outlet duct 40 and the inlet mouth 18*a* of the on-off valve 18 are coupled together, with at least one sealing ring 61 interposed therebetween;
the outlet mouth 18*b* of the on-off valve 18 and the exit section 40*c* are coupled together, with at least one sealing ring 62 interposed therebetween;
the exit section 40*c* and the second threaded connection element 24 are coupled together, with at least one sealing ring 63 interposed therebetween.

Thanks to this sequence of tight connections, the measured gas flow that exits from the metering device 19 cannot return into the inner compartment of the box-shaped body 11 and cannot be measured again by mistake.

The mechanical filtering partition 27 extends from the hollow body 50, and more specifically it extends from the shaped cover 54.

More specifically, said mechanical filtering partition 27 forms a single body with the shaped cover 54.

In the present example of embodiment, the box-shaped body 11 comprises two half-shells 11*a* and 11*b* welded together.

Figure 5:
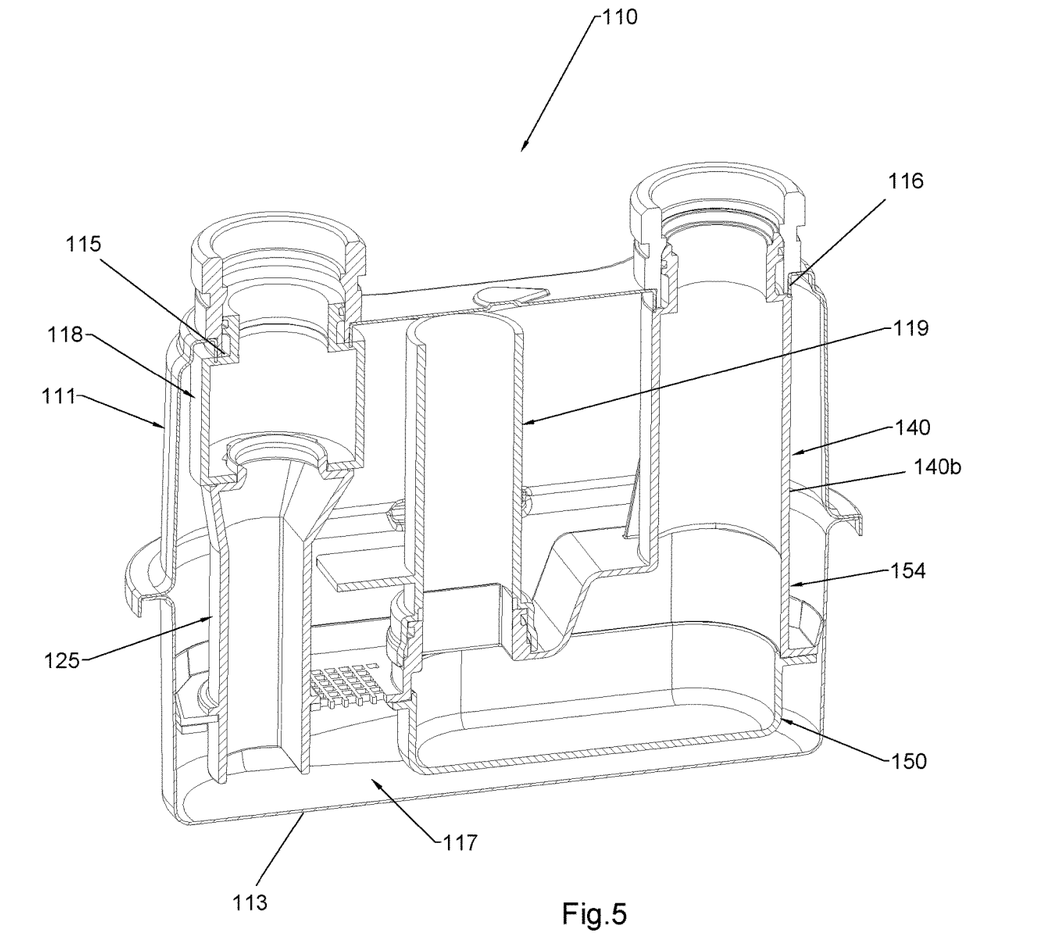
FIG. 5 shows a perspective sectional view of a variant embodiment of the gas meter according to the invention.

FIG. 5 shows a variant embodiment of the gas meter according to the invention, indicated by the numeral 110.

In this variant embodiment, analogously to what has been described above with reference to the preferred embodiment, the gas meter 110 comprises:
a box-shaped body 111,
an inlet mouth 115 and an outlet mouth 116 suited to allow the passage of a gas flow and defined on the box-shaped body 111,
wherein the following elements are present in the box-shaped body 111:

an on-off valve 118 suited to intercept the gas flow through the gas meter 110, and a metering device 119 suited to measure one or more parameters for the determination of the gas flow rate;

wherein the specific characteristic of the gas meter 110 according to the invention lies in that it comprises:

an inlet duct 125 extending from said inlet mouth 115 towards an opposite side 113 of the box-shaped body 111, an outlet duct 140 extending between the outlet mouth 116 and an opposite side 113 of the box-shaped body 111, the metering device 119 being positioned in an intermediate area between the inlet duct 125 and the outlet duct 140.

In this variant embodiment, the on-off valve 118 is placed at the level of said inlet mouth 115 of the box-shaped body 111.

The on-off valve 118 is a part of the inlet duct 125.

Filtering means 117 are provided, analogously to what has been described above with reference to the filtering means 17.

In this variant embodiment, the outlet duct 140 is constituted by a tubular element that extends according to a crossing direction X2.

The on-off valve 18 and 118 is to be understood as being a solenoid valve of the known type or another similar and equivalent on-off valve.

Figure 6:
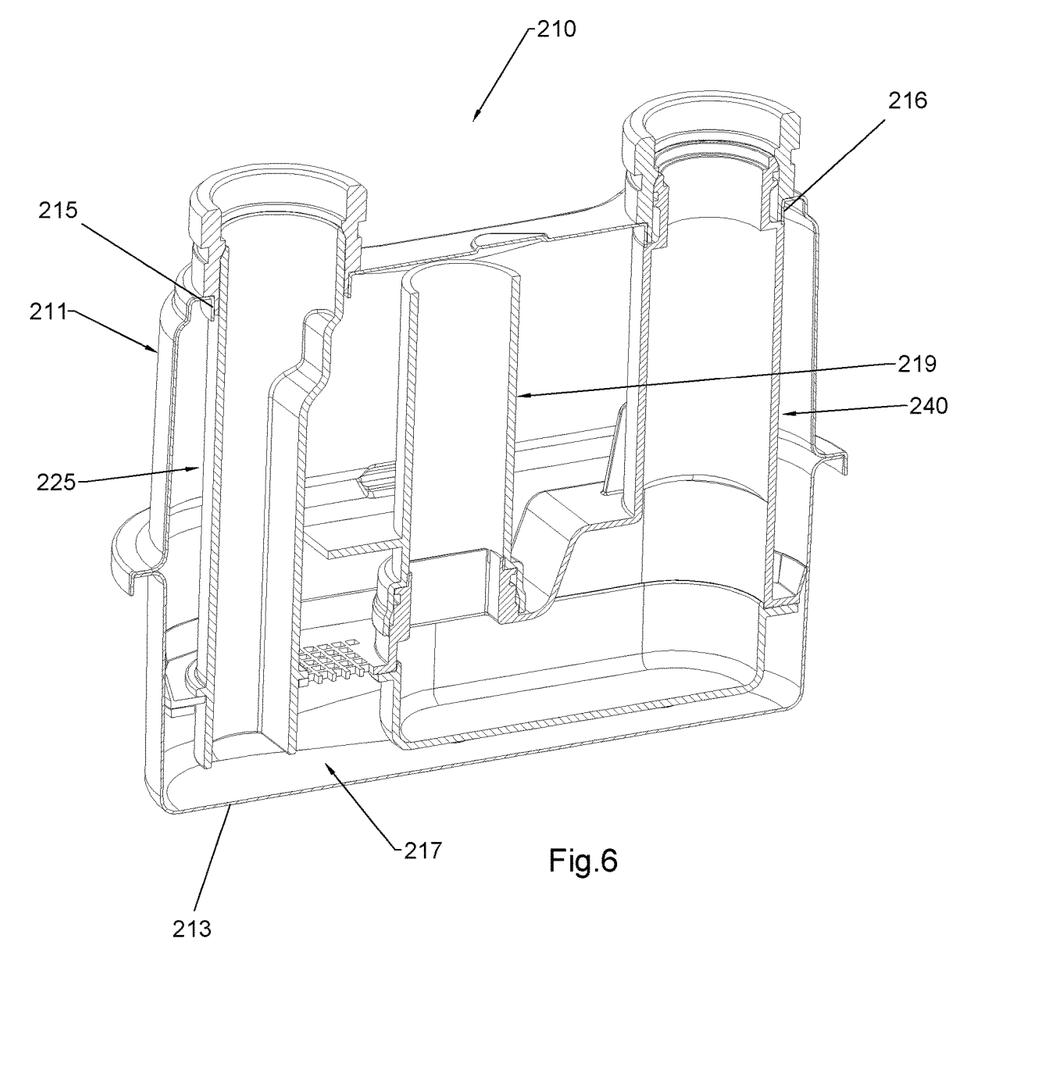
FIG. 6 shows a perspective sectional view of a further variant embodiment of the gas meter according to the invention.

FIG. 6 shows a further variant embodiment of the gas meter according to the invention, indicated by the numeral 210.

In this variant embodiment, analogously to what has been described above with reference to the preferred embodiment, the gas meter 210 comprises:

a box-shaped body 211, an inlet mouth 215 and an outlet mouth 216 suited to allow the passage of a gas flow and defined on the box-shaped body 211, wherein inside the box-shaped body 211 there is a metering device 219 suited to measure one or more parameters for the determination of the gas flow rate;

wherein the specific characteristic of the gas meter 210 according to the invention lies in that it comprises:

an inlet duct 225 extending from said inlet mouth 215 towards an opposite side 213 of the box-shaped body 211, an outlet duct 240 extending between the outlet mouth 216 and an opposite side 213 of the box-shaped body 211, the metering device 219 being positioned in an intermediate area between the inlet duct 225 and the outlet duct 240.

In said variant embodiment, the on-off valve is not provided.

Filtering means 217 are provided, analogously to what has been described above with reference to the filtering means 17.

In this variant embodiment, the inlet duct 225 is constituted by a first tubular element and the outlet duct 240 is constituted by a second tubular element.

It has thus been ascertained that the invention achieves the set purpose and objects.

More specifically, the invention provides a gas meter 10 that, in comparison with the meters known in the art, is capable of considerably reducing the risks of fraud due to tampering with the metering device 19 from the outside, for example in the case where an attempt should be made to access the metering device through the connection elements using a tool designed to hinder the operation of the sensors present in the metering device.

Furthermore, thanks to the filtering means 17 comprising a dust deposit chamber 26 designed to hold back the dust and defined between the bottom side 13 of the box-shaped body 11 and a mechanical filtering partition 27, the gas meter according to the invention is configured in such a way as to prevent the dust present in the gas flow from being transported towards the metering device and even towards the on-off valve 18 by the main gas flow; in this way, the metering and functional performance of the valve is guaranteed and constant over time.

The filtering system is made up in such a way as to collect the dust in a space positioned on the bottom of the meter and perimetrically delimited by sealing edges that prevent the upward flow of gas that has not been filtered by the mesh portion 28.

Furthermore, in our case, the sizing of the total surface area of the through openings of the mesh portion 28 has been carried out trying to identify the optimal balance between the filtering action exerted on the particles and the minimization of the flow resistance intrinsic in the system, while in the known art the difference in pressure between the inlet and the outlet of the gas meter itself keeps increasing as a consequence of the accumulation of particles on the filter during the useful life of the gas meter.

Moreover, in the gas meter according to the present invention, the pressurized gas flow, once filtered, moves upwards towards the top of the box-shaped body 11, where there is the inlet opening 19a of the metering device 19 for the measurement of the flow rate; this position, which is high with respect to the dust deposit chamber 26, is such that during the upward flow of the gas only the lighter particles reach the metering device 19, while the heavier granules fall towards the bottom of the meter due to gravity or adhere to its sides; in this way, the metering device 19 and even more obviously the on-off valve 18, which is the last element of the chain through which the gas flows before exiting from the gas meter 10, are protected against the fouling action of the gas.

The invention as conceived can be subjected to several changes and modifications, all falling within the inventive concept illustrated herein; furthermore, all the details and elements can be replaced by other technically equivalent details and elements.

In practice, any components and any materials can be used, provided that they are compatible with the intended use, and likewise any size and shape can be selected, according to the needs and the state of the art.

Where the characteristics and techniques mentioned in any of the claims are followed by reference signs, it must be understood that these reference signs are used only for the purpose of making the claims easier to understand, consequently these reference signs do not have any limiting effect on the function and meaning of any element identified by the same reference signs by way of example.

The invention claimed is:

1. A gas meter, comprising:
    a box-shaped body, said box-shaped body comprising, with respect to a normal configuration of use, a top side, an opposite bottom side and a side wall;
    an inlet mouth and an outlet mouth suited to allow the passage of a gas flow and defined on said box-shaped body, said inlet mouth and said outlet mouth being defined on said top side;

wherein inside said box-shaped body there is a metering device designed to measure one or more parameters for a determination of a gas flow rate, said metering device being provided with an inlet opening and an outlet opening;

wherein the gas meter further comprises:

an inlet duct extending from said inlet mouth towards an opposite bottom side of said box-shaped body;

an outlet duct extending inside said box-shaped body between said outlet mouth and said opposite bottom side of said box-shaped body in a vertical direction with respect to said normal configuration of use for a majority of a length of said box-shaped body extending between said top side and said opposite bottom side, said metering device being positioned in an intermediate area between said inlet duct and said outlet duct, wherein said metering device is being positioned with said inlet opening facing towards the top side of the box-shaped body with respect to a normal configuration of use.

2. The gas meter according to claim 1, wherein inside said box-shaped body there are means configured to deviate the gas flow that exits from said outlet opening of said metering device and directed towards an inlet opening of said outlet duct.

3. The gas meter according to claim 2, wherein said means configured to deviate the gas flow that exits from said outlet opening of said metering device and directed towards said inlet opening of said outlet duct defines a trajectory comprising a deviation that extends over a deviation angle between a direction crossing said metering device and a direction crossing said outlet duct, said deviation angle being included within an interval ranging between a neighbourhood of 90° and 225°.

4. The gas meter according to claim 3, wherein said deviation angle is equal to 180°.

5. The gas meter according to claim 3, wherein said deviation angle is included within an interval ranging between 91° and 225°.

6. The gas meter according to claim 2, wherein said means configured to deviate the gas flow that exits from the outlet opening of the metering device and direct towards the inlet opening of the outlet duct comprises a hollow body inside which a deviation chamber is defined, said hollow body comprising:

a joining collar suitable for connection with the outlet opening of the metering device; and an entry section of the outlet duct.

7. The gas meter according to claim 6, wherein said inlet duct is constituted by a tubular element that extends along a crossing direction, said crossing direction being parallel to a crossing direction of the metering device and a crossing direction of said outlet duct.

8. The gas meter according to claim 2, wherein said means configured to deviate said gas flow are positioned in proximity to said bottom side.

9. The gas meter according to claim 1, wherein said gas meter comprises an on-off valve arranged inside said box-shaped body as a part of said outlet duct.

10. The gas meter according to claim 1, wherein said metering device is positioned with said inlet opening placed in proximity to the top side of the box-shaped body with respect to a normal configuration of use.

11. The gas meter according to claim 1, wherein said inlet duct is constituted by a tubular element that extends along a crossing direction, said crossing direction being parallel to a crossing direction of the metering device and a crossing direction of the outlet duct.

12. The gas meter according to claim 1, wherein said outlet duct extends in said vertical direction side by side with said metering device.

13. The gas meter according to claim 12, wherein inside said box-shaped body there are means configured to deviate said gas flow that exits from said outlet opening of said metering device and direct toward an inlet opening of said outlet duct, said means configured to deviate said gas flow comprising a duct portion that extends according to a direction that is parallel to said bottom side.

14. The gas meter according to claim 1, wherein said gas meter comprises:

a mechanical filtering partition interposed between said bottom side and said top side;

filtering means to filter said gas flow, said filtering means comprising a dust deposit chamber defined between said bottom side and said mechanical filtering partition, said mechanical filtering partition being provided with a through hole through where said inlet duct is arranged.

15. The gas meter according to claim 14, wherein said mechanical filtering partition comprises a mesh portion, said metering device comprising:

a transit pipe accommodating sensors, said transit pipe to allow said gas flow to pass, said transit pipe comprising said inlet opening and said outlet opening of said metering device;

an intercepting projection positioned outside said transit pipe, configured to meet said gas flow coming from said mechanical filtering partition.

16. The gas meter according to claim 15, wherein said gas intercepting projection is arranged above said mesh portion with respect to said normal configuration of use.

* * * * *